J. BURMEISTER.
TIRE SHIELD.
APPLICATION FILED MAR. 28, 1907.
911,203.
Patented Feb. 2, 1909.
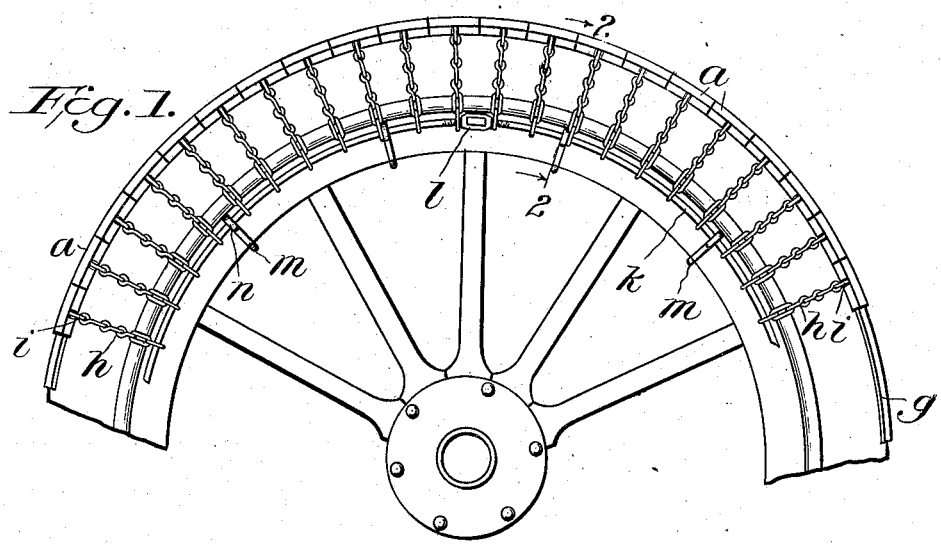
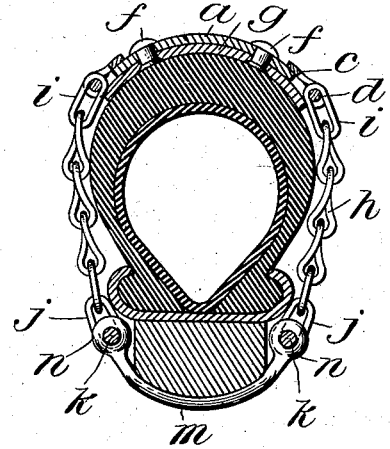
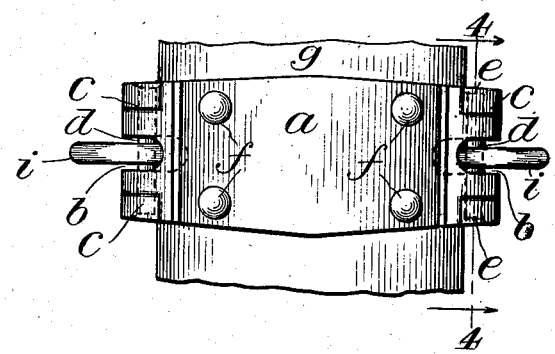
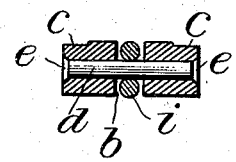
Witnesses
Inventor
John Burmeister
by
Wm. W. Finckel
Attorney

UNITED STATES PATENT OFFICE.

JOHN BURMEISTER, OF SPIRIT LAKE, IOWA.

TIRE-SHIELD.

No. 911,203.  Specification of Letters Patent.  Patented Feb. 2, 1909.

Application filed March 28, 1907. Serial No. 365,188.

*To all whom it may concern:*

Be it known that I, JOHN BURMEISTER, a citizen of the United States, residing at Spirit Lake, in the county of Dickinson and State of Iowa, have invented a certain new and useful Improvement in Tire - Shields, of which the following is a full, clear, and exact description.

Among the principal objects of the invention is to provide an improved shield for vehicle tires, whereby the tires are protected from punctures, and the sides of the tire sheath, as well as its tread, are protected from chafing and wear to which unprotected tires are subjected, when passing over rough and uneven roadways, while at the same time not interfering with the resiliency or cushioning properties of the tire.

A still further object of the invention is to provide improved means for fastening the shield in place over the tire.

The invention consists in a tire shield constructed and arranged to operate substantially as I will proceed now more particularly to set forth and finally claim.

In the accompanying drawings, illustrating the invention, in the several figures of which like parts are similarly designated, Figure 1 is a side elevation of a portion of a wheel showing the shield applied thereto. Fig. 2 is a cross-sectional view, on a larger scale, and taken on the line 2—2, Fig. 1, showing the rim and tire of the wheel, with the shield attached. Fig. 3 is a plan view, on a larger scale, of that portion of the shield which rests upon the tread portion of the tire. Fig. 4 is a transverse section on the line 4—4, Fig. 3, looking in the direction of the arrows, showing the manner of fastening the chains to the metal sections of the shield.

The shield comprises a suitable number of metal plates or sections $a$, made widest at their centers and tapering from a central point upon both sides toward their ends, as shown in Fig. 3, so as to fit in proper abutting relation at their adjacent edges from end to end of the sections when applied to the tire, to thereby form a continuous sectional cover throughout the entire tread surface of the tire. The ends of the sections $a$ are slotted, as at $b$, and bent upon themselves to form eyes $c$, to receive pins $d$, to which short lengths of chain to be referred to are connected. The eyes $c$ are countersunk upon opposite sides, as shown at $e$, Fig. 4.

The sections $a$ are suitably secured, as by rivets $f$, with their adjacent central points in contact, upon a continuous foundation-piece $g$, of any suitable flexible material, preferably leather, adapted to fit directly upon the tread surface of the tire. This leather foundation-piece maintains the several metal sections $a$ of the shield in proper relation both when the shield is on the tire and when it is removed from the tire, and also serves as an additional protection to the tread surface of the tire.

Chains $h$ are connected with the opposite ends of the metal sections $a$ by inserting the end links $i$ in the slots $b$, and inserting the pins $d$ through the eyes $c$ and link $i$. The pins $d$ of each metal plate will be held in place against displacement by the next adjacent plates, and thus the necessity of clenching or upsetting the ends of the pins $d$ is avoided. The ends of the pins $d$ enter the counter-sinks $e$ and are thus clear of the abutting edges of the adjacent sections.

The chains $h$ extend down to about the rim of the wheel and their lowermost links $j$ are threaded upon iron hoops $k$, $k$, arranged upon opposite sides of the wheel, and provided with any suitable adjustable connecting device, such as a turnbuckle $l$, see Fig. 1, whereby the hoops may be contracted and thus draw upon the chains to hold the shield firmly upon the tread of the tire. The hoops $k$ are held in place by connecting-pieces $m$ extending across the rim of the wheel between the spokes thereof, and provided with eyes $n$ at their ends through which the hoops $k$ are threaded.

The shield fits the tire very snugly, and the metal shield sections being constructed of flexible metal and being mounted upon a flexible foundation-piece, permit the shield proper to be drawn down upon the tire by the hoops $k$, and thus made to conform to the tread of the tire, and also to the cushioning or resilient movements of the tire walls when in use, and, therefore, does not impair the resiliency or cushioning properties of the tire, but forms a practically continuous covering or armor for the tread surface of the tire to protect the same from punctures or other injury and wear; and the chains for holding the shield in place as above described extending over the side walls of the tire, serve to protect the sides of the tire from chafing or other injury from rough and uneven road surfaces or other obstacles; and, the chains being flexible, allow full freedom to the cushioning or resilient properties of the tire.

The shield may be removed from the tire by disconnecting the ends of one of the hoops $k$ and unthreading the hoop from the chains $h$ and connecting-pieces $m$, and when removed from the tire the parts of the shield all remain in their connected relation ready to be placed upon the tire when desired, and the pins $d$ are held in place in the eyes $c$ by the adjacent plates, when the shield is removed from the tire as well as when the shield is in place upon the tire.

What I claim is:—

A tire shield, comprising a series of flexible metal plates, each of said plates tapering from a central point toward the ends upon its opposite edges, eyes formed on the ends of said plates, and slots intersecting said eyes, a flexible foundation-piece to which said metal plates are secured with their central points in close proximity to each other, chains having end links inserted in the slots in the ends of said metal plates, and pins passing through the eyes of said plates and said end links, hoops adapted to be arranged upon opposite sides of the wheel rim and engaged by the other end links of the chains, connecting-pieces adapted to extend across and engage the wheel rim and connected with said hoops, and means for adjusting said hoops to cause them to draw upon said chains to thereby conform said metal plates to the tread of the tire and bring adjacent edges in close proximity to each other throughout their length, the pins of each plate being held in place by the edges of the adjacent plates, when the shield is in place upon the tire and when removed therefrom.

JOHN BURMEISTER.

Witnesses:
ELLA M. MONCRIEFF,
C. E. NAREY.